US012619731B2

(12) United States Patent　(10) Patent No.: US 12,619,731 B2
Khatri et al.　(45) Date of Patent: May 5, 2026

(54) DRIFT DETECTION IN MODULAR HARDWARE SYSTEMS

(71) Applicant: Dell Products L.P., Round Rock, TX (US)

(72) Inventors: Mukund P. Khatri, Austin, TX (US); Eugene David Cho, Austin, TX (US); Milton Olavo Decarvalho Taveira, Round Rock, TX (US); Travis Gilbert, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 311 days.

(21) Appl. No.: 18/428,878

(22) Filed: Jan. 31, 2024

(65) Prior Publication Data

US 2025/0245336 A1　Jul. 31, 2025

(51) Int. Cl.
G06F 21/57 (2013.01)

(52) U.S. Cl.
CPC ...... G06F 21/572 (2013.01); G06F 2221/034 (2013.01)

(58) Field of Classification Search
CPC .......................... G06F 21/572; G06F 2221/034
See application file for complete search history.

(56) References Cited

U.S. PATENT DOCUMENTS

| 12,476,987 | B2 * | 11/2025 | Parackal Saby | .... | H04L 63/1416 |
| 2016/0314002 | A1 * | 10/2016 | Khatri | .................. | G06F 9/4403 |
| 2023/0009032 | A1 * | 1/2023 | Khatri | ............... | G06Q 30/0645 |
| 2023/0011005 | A1 * | 1/2023 | Khatri | .................... | G06F 21/44 |
| 2024/0179122 | A1 * | 5/2024 | Hale | .................. | H04L 63/0236 |
| 2024/0303339 | A1 * | 9/2024 | Paulraj | .................. | H04L 9/3268 |
| 2024/0354391 | A1 * | 10/2024 | Veluthakkal | .......... | H04L 9/0891 |
| 2025/0131111 | A1 * | 4/2025 | Cho | ...................... | G06F 21/606 |

* cited by examiner

*Primary Examiner* — Christopher B Robinson
*Assistant Examiner* — Tania M Pena-Santana
(74) *Attorney, Agent, or Firm* — Fogarty LLP

(57) ABSTRACT

Systems and methods include Information Handling Systems (IHSs) that include one or more HPMs (Host Processor Modules), each comprising one or more CPLDs (Complex Programmable Logic Devices). Each CPLD is operated through execution of firmware, and is identified by unique hardware identifiers, and is operated using configurable settings. Each of the CPLDs is configured to transmit a bitstream of the firmware to a DC-SCM while loading the firmware for execution. The DC-SCM (Data Center Secure Control Module) determines whether the signed bitstream transmitted by each of the CPLDs matches a golden firmware measurement maintained for each respective CPLD. The DC-SCM also determines whether the unique identifiers of each of the CPLDs matches a golden hardware identity measurement maintained for each respective CPLD. The DC-SCM also determines whether the configurable settings in use by each of the CPLDs matches a golden configuration settings measurement maintained for each respective CPLD.

20 Claims, 5 Drawing Sheets

DRIFT DETECTION IN MODULAR HARDWARE SYSTEMS

FIELD

This disclosure relates generally to Information Handling Systems ("IHSs"), and more specifically, to systems and methods for management of IHSs.

BACKGROUND

As the value and use of information continues to increase, individuals and businesses seek additional ways to process and store it. One option available to users is an Information Handling System ("IHS"). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

The Open Compute Project's ("OCP's") Datacenter-Modular Hardware System ("DC-MHS") sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model ("SPDM") specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities. Datacenter, edge, and enterprise infrastructure may include various IHSs.

SUMMARY

In various embodiments, systems and methods include Information Handling Systems (IHSs) that may include: a plurality of HPMs (Host Processor Modules), each comprising: one or more CPLDs (Complex Programmable Logic Devices), each operated through the execution of firmware, and each identified by one or more unique hardware identifiers, and each operated using a plurality of configurable settings, wherein each of the CPLDs is configured to transmit a bitstream of the firmware to a DC-SCM while loading the firmware for execution; and the DC-SCM (Data Center Secure Control Module) comprising: at least one processor; and at least one memory coupled to the at least one processor, wherein the at least one memory comprises program instructions stored thereon that, upon execution by the at least one processor, cause the at least one processor to: determine whether the signed bitstream transmitted by each of the CPLDs matches a golden firmware measurement maintained for each respective CPLD; determine whether the one or more unique identifiers of each of the CPLDs matches a golden hardware identity measurement maintained for each respective CPLD; and determine whether the configurable settings in use by each of the CPLDs matches a golden configuration settings measurement maintained for each respective CPLD.

In some embodiments, the DC-SCM further comprises a CPLD operated through the execution of firmware, and identified by one or more unique hardware identifiers, and operated using a plurality of configurable settings. In some embodiments, execution of instructions by the processor of the DC-SCM causes the processor to: determine whether firmware loaded for use by the CPLD of the DC-SCM matches a golden firmware measurement maintained for this CPLD. In some embodiments, execution of instructions by the processor of the DC-SCM causes the processor to: determine whether one or more unique identifiers reported by the CPLD of the DC-SCM match a golden hardware identity measurement maintained for this CPLD. In some embodiments, execution of instructions by the processor of the DC-SCM causes the processor to: determine whether one or more configurable settings reported in use by the CPLD of the DC-SCM match a golden configuration settings measurement maintained for this CPLD. In some embodiments, the at least one processor comprises a platform Root-of-Trust (PRoT). In some embodiments, one or more of the CPLDs comprise FPGAs. In some embodiments, the plurality of configurable settings comprise at least one of security settings and debugging settings. In some embodiments, the debugging settings comprise the status of a Joint Test Action Group (JTAG) interface of a Host Processor Module to which each respective CPLD is coupled. In some embodiments, each of the CPLDs is configured to halt execution of the loaded firmware until receiving notification that the signed bitstream transmitted by each respective CPLD matches the golden firmware measurement maintained for each respective CPLD.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
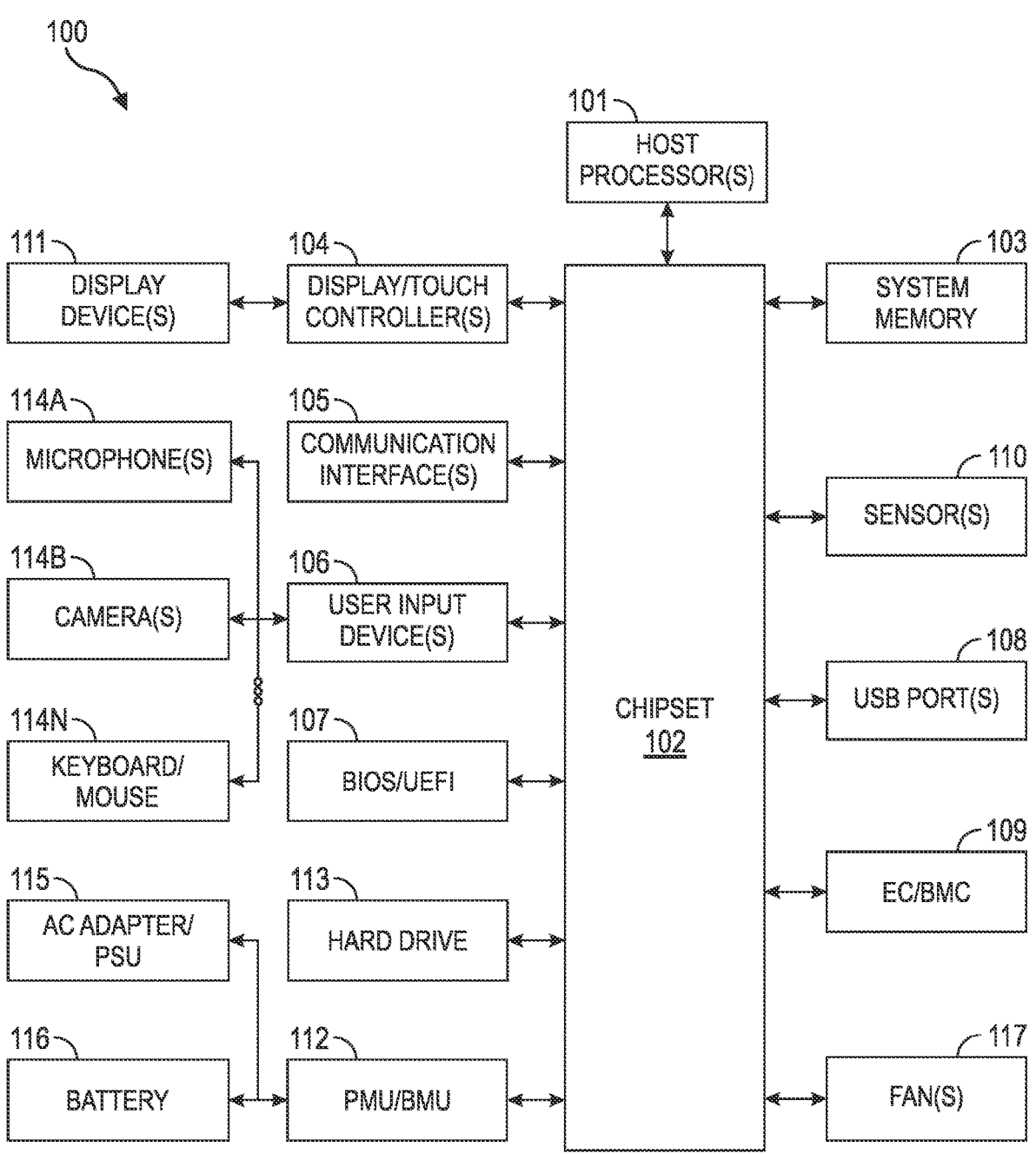
FIG. 1 is a diagram illustrating examples of hardware components of an Information Handling System (IHS), according to some embodiments.

FIG. 1 is a block diagram of hardware components of IHS 100, which may be used to implement the systems and methods for detecting drift in components of a DC-MHS. An IHS 100 may be a rack-mounted server that may constructed from a chassis with multiple bays or other slots by which computing and/or storage nodes may be coupled to the IHS. An IHS 100 may be used to implement a DC-SCM for management of data center operations, specifically those in support of DC-MHS. In some embodiments, an IHS 100 may additionally or alternatively include bays or other slots for receiving one HPMs.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
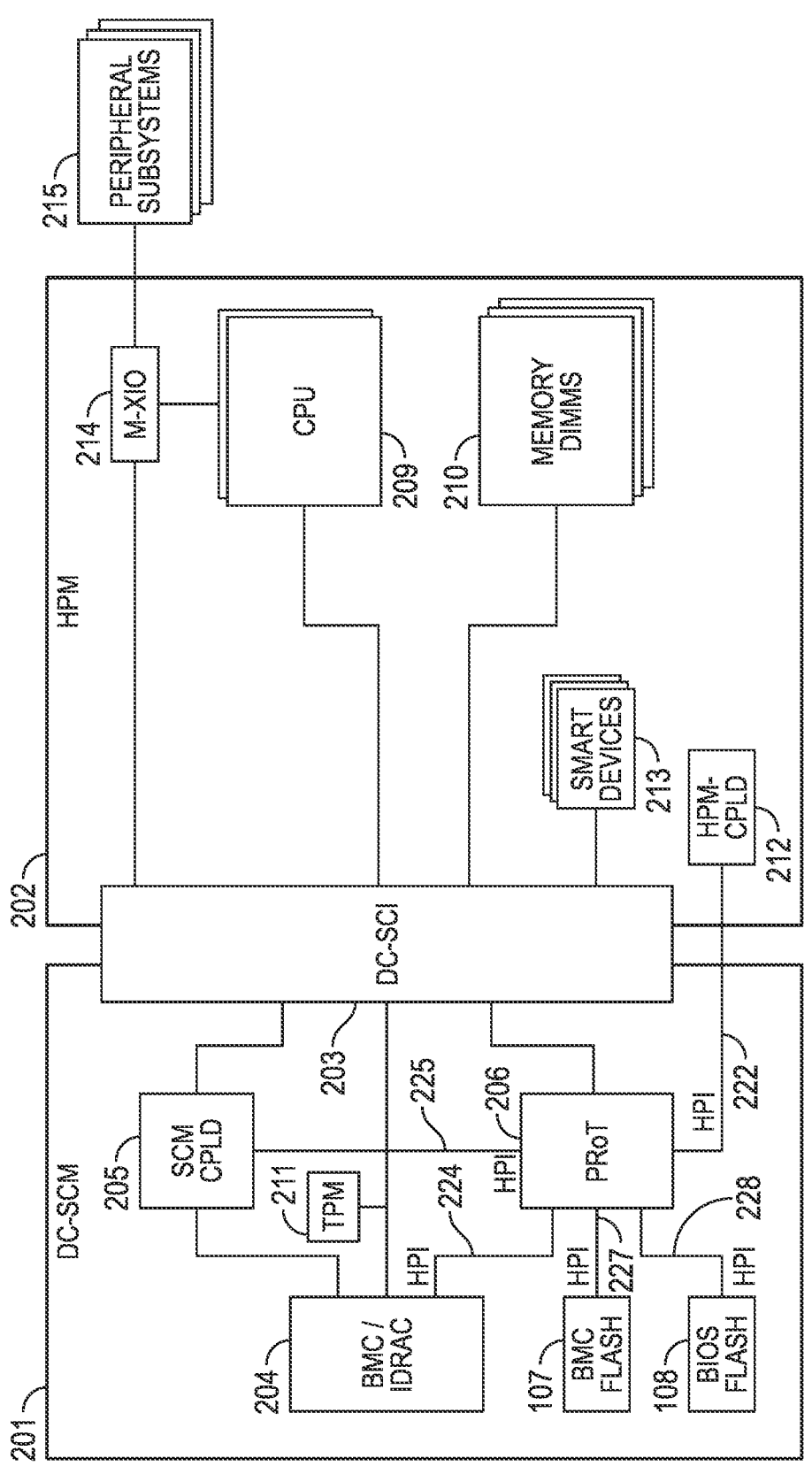
FIG. 2 is a block diagram illustrating certain components a Datacenter-Modular Hardware System ("DC-MHS") configured, according to some embodiments, for detecting drift in components of the DC-MHS.

FIG. 2 is a block diagram illustrating certain components a Datacenter-Modular Hardware System ("DC-MHS") configured, according to some embodiments, for detecting drift in components of the DC-MHS.

Modular server architectures give cloud service providers a variety of compute choices to meet market and business conditions, offer flexible configurations, and deliver innovative solutions. The Datacenter-Modular Hardware System ("DC-MHS"), which may be considered to form at least part of an IHS, provides interoperability between datacenter, edge, and enterprise infrastructure using consistent interfaces and modular building blocks. DC-MHS standardizes various Host Processor Module ("HPM") form factors and provides supporting elements for interoperability of HPMs across various platforms. The HPM is managed by a Datacenter-Secure Control Module ("DC-SCM"), which is designed to enable a common management and security infrastructure across platforms within a data center. The interface between the DC-SCM and the HPM can be referred to as the Datacenter-Secure Control Interface ("DC-SCI").

The HPM is a traditional CPU-memory device with the Baseboard Management Controllers ("BMCs") and security functions moved to the DC-SCM. HPMs are not limited to a standard processor architecture and can apply any processor architecture utilizing management and security features.

IHSs are increasingly complex, and composable Hardware systems. A single IHS may include any number of CPLDs (Complex Programmable Logic Device) that may be used to implement specialized computing functions. In some embodiments, a CPLD may include FPGAs (Field Programmable Gate Arrays). CPLDs may include various forms of programmable logic capabilities and may include one or more secure memories from which instructions may be loaded for operation. As described in additional detail below, secured CPLDs may include attestation capabilities. DC-MHS may divide a single motherboard into portions that can be operated separately or aggregated together operating as a single motherboard. While the interchange capabilities provided by DC-MHS has enhanced the configurability of IHSs, these capabilities can create security breaches when bad actors (e.g., hackers) are able to configure CPLDs with malicious instructions.

Referring back to FIG. 2, DC-SCM 201 is coupled to HPM 202 via a datacenter secure control interface ("DC-SCI") 203. DC-SCI can be a mix of all types of interfaces, both high privilege interfaces ("HPIs") and low privileged interfaces ("LPIs"). Examples of LPIs are Serial Peripheral Interface ("SPI"), Inter-Integrated Circuit ("I²C"), Universal Asynchronous Receiver-Transmitter ("UART"), etc. The DC-SCM 201 consists of a BMC 204, which is a specialized service processor that monitors the physical state of the server. As a non-limiting example of a BMC 204, the integrated Dell Remote Access Controller (iDRAC) from DELL, INC. is embedded within DELL® PowerEdge servers and provides functionality that helps information technology (IT) administrators at remote operations centers deploy, update, monitor, and maintain servers or other IHSs.

A SCM complex programmable logic device (SCM-CPLD) 205 may contain application specific logic and a high-speed and scalable Low-voltage differential signaling Tunneling Protocol & Interface ("LTPI"). A Platform Root of Trust ("PRoT") Security Processor 206 may implement attestation for the BMC, BIOS, and/or other firmware images on the system. The ProT 206 may also be responsible for attestation of the SCM-CPLD 205 and the HPM-CPLD 212. The ProT 206 may operating using a separate High Privileged Interface ("HPI") signaling pathway to CPLDs (i.e., a Joint Test Action Group ("JTAG") interface). A HPI may be a highly-privileged PRoT/BMC code interface (such as the ProT or BMC Bootloader). The HPI may be support the on-boot authentication of bitstream code over this HPI, and for verifying the bitstream prior to load. In FIG. 2, the ProT 206 has a separate HPI 228 to the BIOS Flash 208, an HPI 227 to the BMC Flash 207, an HPI 224 to the BMC/iDRAC 204, an HPI 225 to the SCM-CPLD 205, and an HPI 222 to the HPM-CPLD 212.

The DC-SCM may also contain a Trusted Platform Module (TPM) 211, a BMC Flash 207, and a BIOS Flash 208. The TPM provides hardware-based, security-related functions for CPUs 209 through integrated cryptographic keys. The BMC Flash 207 can consist of one or more flash devices used to contain the BMC firmware image. The BIOS Flash 208 can consist of one or more flash devices used to contain the BIOS firmware image for each node.

HPM 202 provides a general form factor that supports maximum input/output ("I/O") of CPUs 209 in complains processor slots. HPM 202 also includes memory or Dual In-line Memory Modules (DIMMs) 210. The HPM 202 form factor does not require a specific CPU 209 or memory 210 technology. Various HPM 202 form factors support different numbers of CPUs 209 and memory slots 210. The HPM specifications are adapted to allow multiple generations of compute core designs to fit into the form factor specification so that chassis and system designs can be reused as desired.

HPM-CPLD 212 can support data exchange between SCM-CPLD 205 and HPM 202 using LPTI, in some embodiments. In other configurations, HPM 202 may include other hardware components (not shown), such as memory devices, graphics processing units (GPU), peripheral I/O, etc.

HPM 202 may also include one or more smart devices 213, such as a Smart Network Interface Card (NIC), which is a programmable device used to improve data center networking performance, security, features, and flexibility. Other smart devices (e.g., HPM-CPLDs 212) may include, for example, smart network interface cards ("SmartNICs"), data processing units ("DPUs"), and infrastructure processing units ("IPUs").

In the DC-MHS environment an Extensible I/O (M-XIO) source connector 214 enables connectivity to peripheral subsystems 215. M-XIO 214 is a universal hardware API intended to enable the connectivity requirements of multiple different peripheral modules 215 without requiring a connector hardware. M-XIO 214 connector on HPM 202 includes a set of sideband signals that relies on circuitry to serialize/deserialize virtual wires that are tunneled over a 1-wire interface, called the Modular-Peripheral Sideband Tunneling Interface ("M-PESTI"). Peripheral subsystems 215 may include, for example, Enterprise and Datacenter Standard Form Factor ("EDSFF") devices, Redundant Array of Independent Disks ("RAID") controllers, Peripheral Component Interconnect Express ("PCIe") Card Electro-Mechanical ("CEM") cards, back planes, and OCP NIC 3.0 adapter cards. Other hardware interfaces and connectors to couple HPM 202 to chassis infrastructure elements and subsystems may follow the Platform Infrastructure Connectivity ("M-PIC") specification.

DC-MHS provides a family of specifications to enable interoperability between datacenter and enterprise infrastructure by providing consistent interfaces and form factors among modular building blocks. For example, the Open Compute Project® is developing the following HPM specifications. The Modular Hardware System Full Width Specification ("M-FLW") is an HPM form factor specification that is optimized for using the full width of a standard rack-mountable server. The Modular Hardware System Partial Width Density Optimized Specification ("M-DNO") is an HPM specification that is targeted to partial width, such as half-width or three-quarters-width, form factors.

The DC-SCM design can simplify the deployment of HPMs and increases the efficiency for time to market deployment for new systems. The DC-SCM can have a standardized pinout and definition, which provides common boot, monitoring, control, and remote debug for diverse platforms. DC-SCI 203 can support several PCIe bus options between DC-SCM 201 and HPM 202, including PCIe Gen 2.0 up to PCIe Gen 5.0 x1 interface, SPI interfaces, NC-SI RMII-based transport ("RBT") interface, LTPI, eSPI bus, and I²C/I³C bus, among others.

Figure 3:
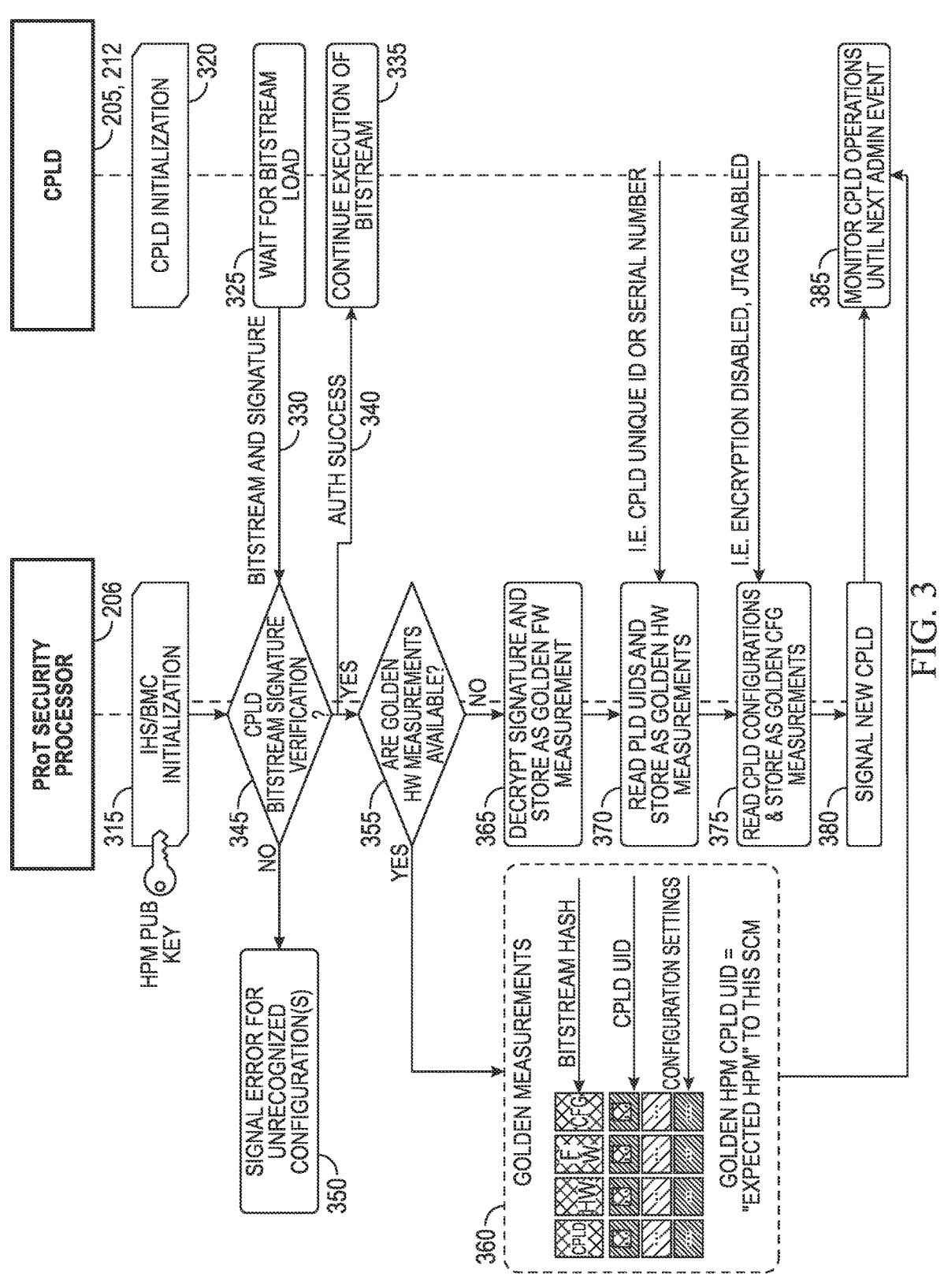
FIG. 3 is flowchart illustrating steps of methods, according to some embodiments, for detecting drift in components of a DC-MHS.

FIG. 3 is flowchart illustrating steps of methods, according to some embodiments, for detecting drift in components of a DC-MHS. As described, an IHS supporting DC-SCM 201 may operate using a PRoT (Platform Root of Trust) security processor 206 that includes cryptographic capabilities used in attestation of the validity of detected hardware components of the IHS, such as based on validation of firmware detected in use by these hardware components against references signatures derived from authentic firmware. Using instructions validated by the PRoT security processor 206, the DC-SCM 201 manages operations of the IHS, including of the multiple HPMs 202 that may be included in the IHS.

As described, HPMs 202 that are managed by the DC-SCM may include one or more CPLDs (Complex Programmable Logic Devices) 212 that may be programmed to implement specialized computing tasks, such as implementing artificial intelligence algorithms. Also as described, a DC-SCM 201 may also utilize CPLDs 205 in implementing application-specific logic, such as applications for balancing the processing loads of HPMs 202, where such balancing may be adapted through the programming of CPLD 205 to account for the particular capabilities of each of the particular HPMs 202, which may include various different types of processing technologies. In addition, the CPLD 205 of DC-SCM 201 may be programmed to implement a Low-voltage differential signaling Tunneling Protocol & Interface ("LTPI") that is used in interfacing with the HPMs 202, where the interface may be specialized through the programming of CPLD 205 to account for the particular signaling capabilities of each of the HPMs 202.

Through the configurable capabilities provided by the CPLDs 205, 212 of the DC-SCM 201 and the HPMs 202, an IHS may support high-speed, low-latency computational capabilities that can be tailored to specific computations, such as artificial intelligence computations. Conversely, misconfiguration of any one of these CPLDs 205, 212 may introduce errors or inefficiencies that may reduce the computation abilities of the IHS. In a data center environment, teams of local and remote administrators may participate in management of IHSs, resulting in the possibility of inadvertent modifications to an IHS that may be difficult to identify. Accordingly, embodiments support tracking of the operating states of these configurable processing components of the IHS.

In FIG. 3, operations of CPLDs 205, 212 are validated or used as a reference for future validations. Accordingly, the operations of FIG. 3 may be undertaken upon the first initialization of an IHS and/or upon certain administrative operations. In the illustrated embodiment, the PRoT security processor 206 interfaces with each of the CPLDs 205, 212 of the IHS in order to validate the operations of these CPLDs and to establish reference measurements for use in ongoing validation of these CPLDs. Some embodiments may begin, at 315, with the initialization of the PRoT security processor 206, such as based on booting or restarting the IHS, or in a separate restart of the DC-SCM 201. As part of the booting of the IHS, at 320, the CPLDs 205, 212 of the HPMs 202 and of the DC-SCM 201 are also initialized.

In embodiments, each of the CPLDs 205, 212 may be programmed, at 325, to detect completion of a bitstream of instructions that are loaded for operation of each respective CPLD. Upon completion of this loading, at 330, a signature of the bitstream is calculated and transmitted along with the bitstream itself to the PRoT security processor 206. For each of the CPLDs 205, 212, at 335, the PRoT security processor 206 receives a bitstream and signature that is presented and, at 345, confirms the validity of the signed bitstream as authentic instructions. For instance, the PRoT security processor 206 may interface with the HPMs 202, such as via the DC-SCI 203 in confirming proof of possession of the keypair used to calculate the presented signature and thus to confirm the bitstream of instructions is authentic, but without validation of these instructions as the correct ones.

As indicated in FIG. 3, if the bitstream of instructions is confirmed as authentic, at 340, the PRoT security processor 206 notifies each of the respective CPLDs 205, 212 of the validation. In response, at 335, a CPLD 205, 212 receiving confirmation of this validation of loaded instructions may continue operations using the loaded instructions. Even if the loaded instructions are not optimal, embodiments allow operation of CPLDs 205, 212 as long as the loaded instructions are deemed authentic and thus trustworthy. In this manner, the operation of CPLDs 205, 212 is not restricted if no security risk is present, thus supporting immediate use of the CPLDs 205, 212, even if not optimally configured.

In scenarios where the signed bitstream of a CPLDs 205, 212 that is presented by an HPM 202 is not authenticated, at 350, the PRoT security processor 206 may signal an error indicating the failure to load authenticated instructions by a CPLD 205, 212, which may be a CPLD of an HPM 202, or of the DC-SCM 201. In instances where the bitstream that is not authenticated is presented by a CPLD 212 of an HPM 202, that particular CPLD 212 and/or HPM 202 may be disabled by the DC-SCM 201 until the instructions used by the CPLD 212 can be validated as authentic. In instances where the bitstream that is not authenticated is presented by a CPLD 205 of DC-SCM 201, a core validation failure may be signaled. If the instructions in use by a CPLD 205 of the DC-SCM 201 are compromised, the operations of all of the HPMs 202 may be at least partially compromised as a result. Accordingly, embodiments may halt operations of the DC-SCM 201, and of the HPMs 202, until the instructions in use by this CPLD 205 can be validated as authentic.

In scenarios where a signed bitstream is authenticated and a CPLD 205, 212 has initiated operations using the loaded bitstream, at 355, the PRoT security processor 206 determines whether any reference measurements are available for that particular CPLD, where the most current of these measurements may be designated as the golden measurement for this particular CPLD. If no reference measurements are available for this CPLD, at 365, the PRoT security processor 206 may interface with the CPLD 205, 212 in resolving the hash value used in generating the digital signature provided, at 330, by the CPLD. Once this hash has been securely provided to the PRoT security processor 206, as indicated in FIG. 3, this value is stored as the golden measurement for this particular CPLD.

Embodiments may continue, at 370, with the validation of the CPLD 205, 212 itself. As described, DC-HMS supports highly modular and interchangeable systems of hardware components for use in a data center, which may include various modes of swapping HPMs 202 that are in use by an IHS. Accordingly, the HPMs 202 and CPLDs 212 installed therein that are managed by the DC-SCM 201 may be replaced at any time, whether physically or logically, within an IHS. Accordingly, as indicated in FIG. 3, the PRoT security processor 206 queries the CPLD 205, 212 for identifying information, such as a unique token, unique ID (UID), serial number, certificate, or other cryptographic or non-cryptographic values that uniquely identify the CPLD. At 370, the PRoT security processor 206 stores this identifying information as part of the golden measurements for this particular CPLD 205, 212.

The PRoT security processor 206 may continue, at 375, by querying the CPLD 205, 212 for the status of various configurable settings that are supported by the CPLD, and that may include privileged or otherwise secure-related functions. For instance, a CPLD may support configurable encryption capabilities, settings providing management of on-board memory of the CPLD, settings for throttling or otherwise tuning the processing speeds supported by the CPLD (such as in accordance with service level agreements being enforced by the DC-SCM) and/or debugging (e.g., JTAG) capabilities. In some embodiments, the CPLDs 205, 212 may also include settings by which to enable restricted manufacturer functions, thus allowing a vendor purchasing a CPLD for installation in an HPM or other hardware may access manufacturer functions in their own facilities in order to configure the CPLD for a specific deployment.

Enabling or disabling of any of these configurable settings of the CLPD may be a result of legitimate administrative operations, but may also be due to malicious or inadvertent operations. Accordingly, detecting drift in such settings of a CPLD may provide indications of security breaches, or of inadvertent misconfiguration of these important computing resources. As indicated in FIG. 3, the PRoT security processor 206 stores the received configurable settings as part of the golden measurements for this particular CPLD 205, 212. With the golden measurements for this CPLD 205, 212 fully populated, at 380, the PRoT security processor 206 may generate notifications of a new CPLD that is operational and managed by the DC-SCM. At 385, operations may continue until the next administrative event occurs. In response, some embodiments may generate a signal or flag for review of detected drift in CPLD settings for review by the next administrator to utilize the DC-SCM in management of the HPMs, or in some instances upon any use of the DC-SCM management features.

Figure 4:
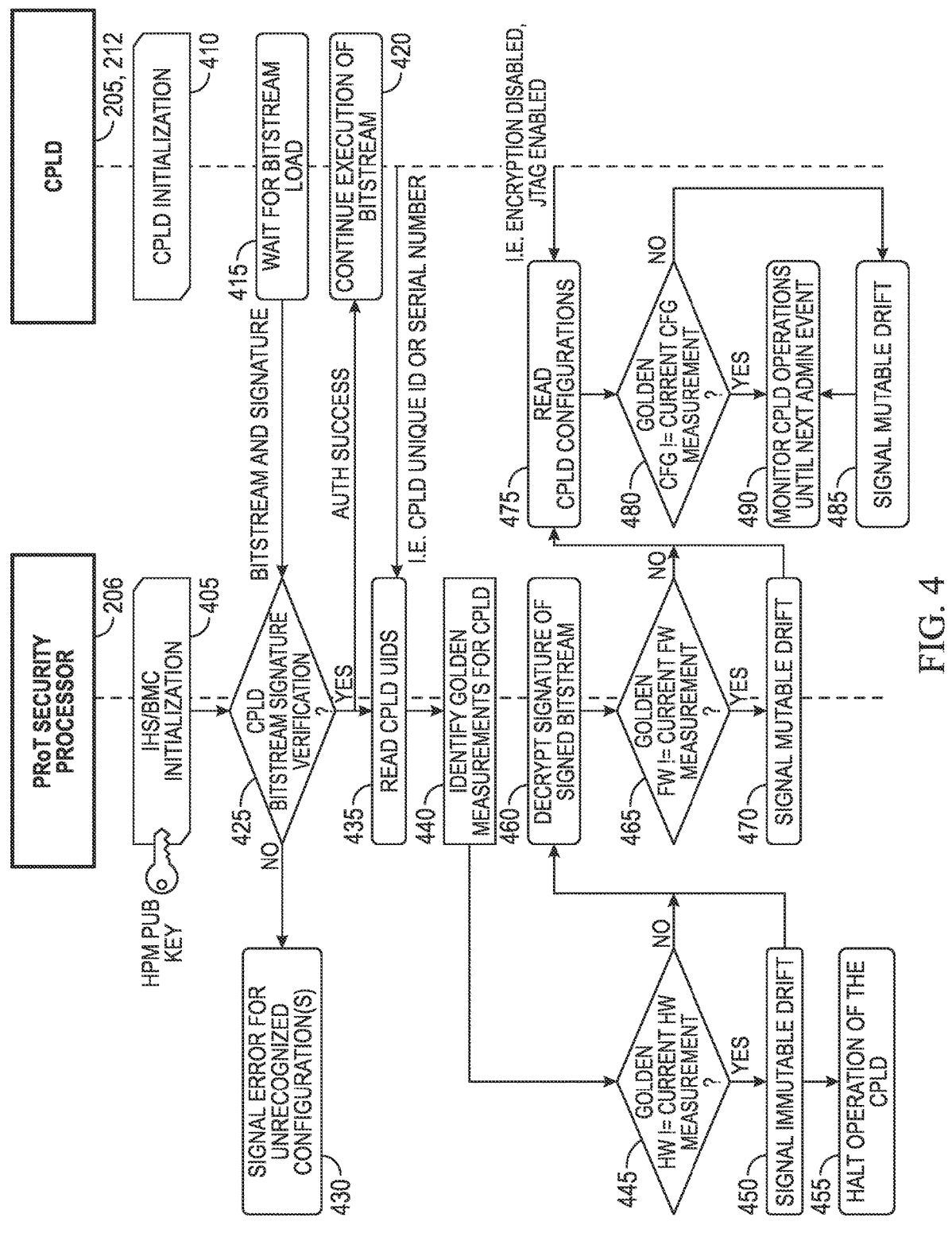
FIG. 4 is flowchart illustrating additional steps of methods, according to some embodiments, for detecting drift in components of a DC-MHS.

FIG. 4 is flowchart illustrating additional steps of methods, according to some embodiments, for detecting drift in components of a DC-MHS. In FIG. 4, an IHS may be booted or otherwise re-initialized, where the PRoT security processor 206 has previously established a set of golden reference measurements for a CPLD 205, 212 installed in the IHS, whether in one of the HPMs 202 or in the DC-SCM 201. At 405, the PRoT security processor 206 is initialized, followed by initialization of the CPLD 205, 212. As described above, at 415, the CPLD 205, 212 waits for loading from memory of a bitstream of firmware or other instruction and provides a signed bitstream to the PRoT security processor 206.

Based on the received signed bitstream, at 425, the PRoT security processor 206 validates the authenticity of the instructions being loaded by the CPLD 205, 212. Based on notification from the PRoT security processor 206, at 420, the CPLD 205, 212 begins operations through execution of the loaded bitstream. As before, at 430, the PRoT security processor 206 may generate various errors in response to a failed validation of a presented bitstream. In scenarios where the bitstream of instructions in use by the CPLD 205, 212 is validated, at 435, the PRoT security processor 206 queries the CPLD 205, 212 for its unique identifier(s), such as the various cryptographic and non-cryptographic identifiers described above.

Based on unique identifier(s), at 440, the PRoT security processor 206 identifies the golden measurements associated with this particular CPLD 205, 212, such as the measurements stored using the procedures of FIG. 3.

In particular, the PRoT security processor 206 retrieves from the golden measurements the stored hash value that corresponds to the reference firmware for this particular CPLD 205, 212. At 445, the PRoT security processor 206 compares the presented unique identifiers against the hardware identity golden measurements, thus confirming that identifiers being presented correspond to all of the different identifiers that were presented during generation of the golden measurement. If the CPLD 205, 212 presents a valid identifier that does correspond to golden measurement entries, but fails to provide all of the identifiers included in the golden measurements, or provides any identifiers that conflict with those included in the golden measurements, at 450, the PRoT security processor 206 may signal drift in immutable characteristics of the CPLD.

In scenarios where drift is detected with respect to immutable characteristics of the CPLD, such as hardware identifiers, such drift may provide indications of physical tampering or other malicious modifications to the CPLD. Accordingly, at 455, embodiments may issue notifications to administrators indicating a mismatch in the hardware identity that has been presented by a CPLD. As above with regard to validation of signed bitstream provided by each CPLD 205, 212, the detection of drift with respect to immutable characteristics of the CPLD may be treated differently depending on whether the CPLD is one of the HPMs 202, or in the DC-SCM 201.

For a CPLD 212 in an HPM 202, drift in an immutable characteristic may result in halting of the operation of the CPLD, in which case the HPM may continue limited operations. In some embodiments, the detection of drift in an immutable characteristic of a CPLD 212 in an HPM 202 may trigger an event at the next reinitialization for confirmation of the status and hardware identity of the HPM. For a CPLD 205 of the DC-SCM 201, drift in an immutable characteristic of the CPLD may result in an error condition indicating possible tampering in the hardware of the DC-SCM 201, thus possibly compromising all of the HPMs 202. As such, the error condition that is generated in such condition may also immediately transition the operations of the DC-SCM 201 to a safe and/or diagnostic mode.

In scenarios where the hardware identity reported by the CPLD 205, 212 matches the golden measurements for that particular CPLD, and in scenarios where any drift in the immutable characteristics of the CPLD does not preclude continued operation of the CPLD, at 460, the PRoT security processor 206 obtains the decrypted signature of the signed bitstream, such as described above, from the HPM 202 of the CPLD 212, or through its own operations for a CPLD 205 of the DC-SCM 201. At 465, the PRoT security processor 206 retrieves from the golden measurements the stored hash value that corresponds to the reference firmware for this particular CPLD 205, 212. The PRoT security processor 206 compares this golden hash for the CPLD 205, 212 firmware against a hash value calculated from the signed bitstream provided, at 415, by the CPLD upon its initialization. If the calculated hash matches the golden measurement, embodiments may continue to validation of the configuration setting reported in used by the CPLD 205, 212.

As indicated in FIG. 3, in scenarios where the hash of the bitstream of the loaded firmware does not match the hash from the golden measurement for this CPLD 205, 212, at 470, embodiments may signal drift in mutable characteristics of the CPLD. As opposed to the hardware identity reported by the CPLD 205, 212, some changes to the firmware in use by the CPLDs is expected. Accordingly, the signaling of drift in mutable characteristics of the CPLD may allow the CPLD to continue operating. Embodiments may limit or condition the operation of the CPLD in various manners upon detecting firmware drift, such as to initiate elevated monitoring of the CPLD 205, 212 by the DC-SCM 201, and such as to restrict I/O capabilities of the CPLD.

In scenarios where the firmware reported by the CPLD 205, 212 matches the golden firmware measurement for that CPLD and where drift does not preclude continued operation of the CPLD, at 475, the PRoT security processor 206 queries the configurable settings in use by the CPLD, such as security and debugging settings. At 480, the PRoT security processor 206 compares the settings against the golden measurements for these settings. In some embodiments, this comparison may be conducted based on individual settings that are reported by the CPLD 205, 212 and that are present in the golden measurements. In some embodiments, the comparison may be conducted collectively on the configuration settings that presented, thus limiting a successful match to a CPLD that presents the same set of configuration settings as presented during generation of the golden measurements.

As with modifications to the firmware of the CPLD 205, 212, modification to the configurable settings of the CPLD are also expected such that drift in mutable characteristics of the CPLD does not preclude its ongoing operation. Accordingly, at 485, the signaling of drift in mutable configuration settings may result in elevated monitoring of the CPLD 205, 212, where such monitoring may be targeted at the settings for which drift has been detected. In some embodiments, the drift in configuration settings may result in notifications for review during the subsequent administrative event. In scenarios where the reported configuration settings of the CPLD 205, 212 match the golden measurements and where discrepancies do not preclude continuing operation, at 490, operations of the CPLD may continue using the loaded firmware and using the reported settings, with additional monitoring by the DC-SCM 201 initiated in response to any drift in mutable characteristics of the CPLD.

Figure 5:
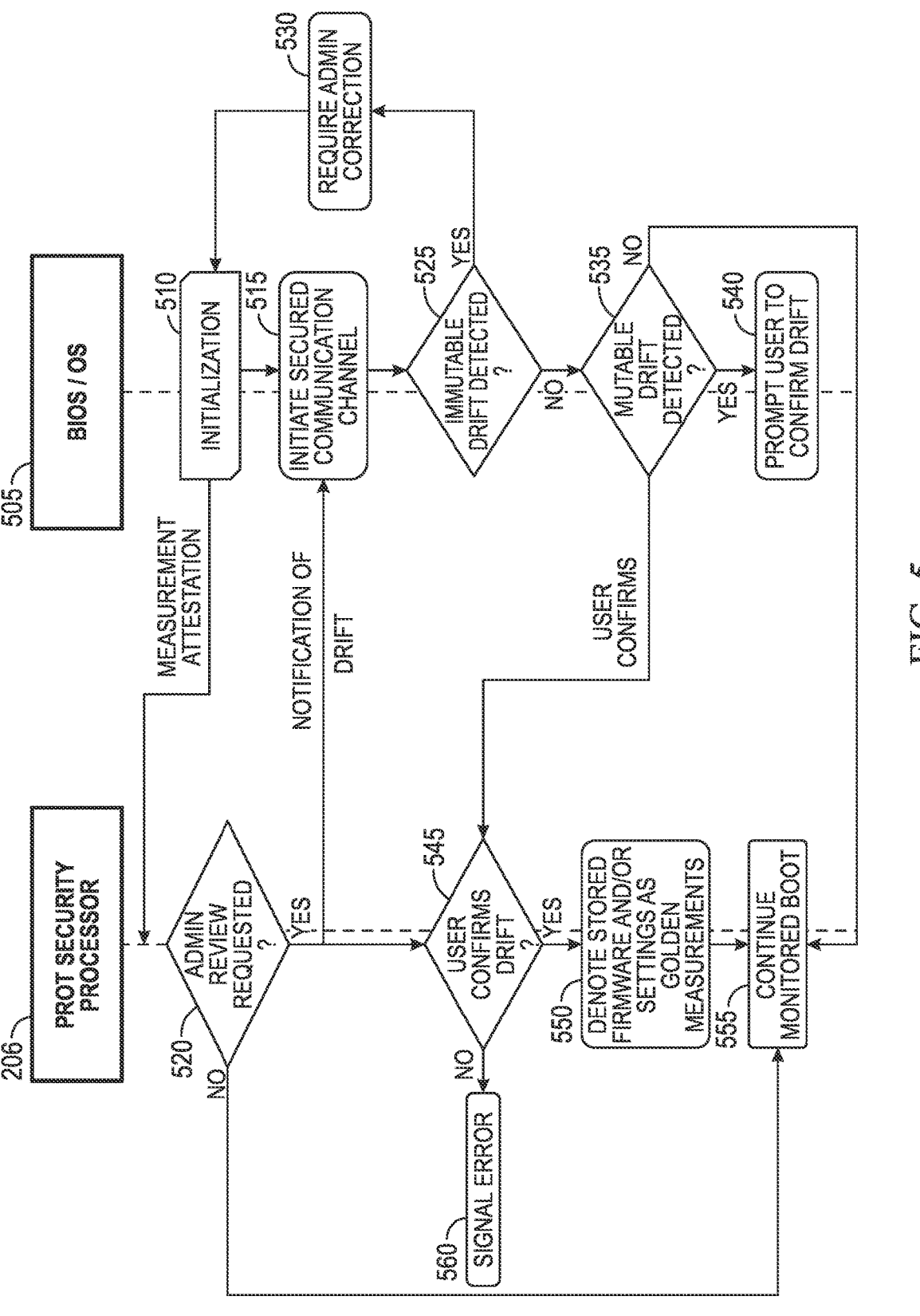
FIG. 5 is flowchart illustrating additional steps of methods, according to some embodiments, for detecting drift in components of a DC-MHS.

FIG. 5 is flowchart illustrating additional steps of methods, according to some embodiments, for resolving detected drift in components of a DC-MHS. As described, upon detecting drift in mutable and/or immutable characteristics of a CPLD 205, 212 of a DC-MHS, various actions may result from detection such drift, which may include disabling certain components, such as disabling use of a CPLD 205 of a DC-SCM 201 in response to detecting any drift in any mutable or immutable characteristic of the CPLD, or in generating request for evaluation and confirmation of the drift by an administrator at the next administrative event.

In the illustrated embodiments, an administrative event is signaled, at 510, upon initialization of the operating system (OS) or BIOS 505 of the IHS, as described with regard to the IHS 100 of FIG. 1. In some embodiments, the OS/BIOS 505 triggers the administrative event through requesting attestation of instruction used by the OS/BIOS 505 in resolving detected drift in characteristics of a CPLD 205, 212. As indicated in FIG. 5, the OS/BIOS 505 may transit a digital signature generated from these instructions to the PRoT security processor 206 for attestation. Prior to transmission of an attestation request, at 515, the OS/BIOS 505 may establish a secure communication channel with the PRoT security processor 206, such as via secure management channels support between the BMC 204 of the DC-SCM 201 and the OS/BIOS 505 used to operate the IHS.

In response and as indicated in FIG. 5, at 520, the PRoT security processor 206 may determine whether an administrative review has been request for any detected drift in characteristics of any of the CPLDs 205, 212. If no such administrative review has been requested, the PRoT security processor 206 may provide attestation of the instructions reported by the OS/BIOS 505 and may continue, at 555, to continue monitored booting of the OS/BIOS 505 and of operations managed by the DC-SCM 201. As indicated in FIG. 5, in scenarios where an administrative review has been requested for detected drift, a notification is transmitted to the OS/BIOS 505 that describes the different forms of immutable and/or mutable drift in the characteristics reported by the CPLD.

Based on the provided drift notifications, at 525, the OS/BIOS 505 determines whether the notification specifies any drift in immutable characteristics of a CPLD 205, 212. As described, drift in an immutable characteristic of a CPLD 205, 212 may be indicative of physical tampering, or of other malicious modifications to the CPLD. Accordingly, in some embodiments, drift in an immutable characteristic may trigger, at 530, the OS/BIOS 505 to prompt the user to inspect and correct this discrepancy with regard to the hardware identity reported by the CPLD 205, 212. In some embodiments, further operation of the IHS may be halted until the user address this discrepancy, such as in scenarios where the drift in hardware identity is reported by a CPLD 205 of the DC-SCM 201, whereas such a discrepancy in a CPLD 212 of an HPM 202 may result in halting further operation of that particular HPM until the discrepancy with regard to the hardware identity of the CPLD 212 of the HPM is resolved.

In scenarios where there is no reported drift in mutable characteristics of a CPLD, at 535, the OS/BIOS 505 determines whether any drift in mutable characteristics of the CPLD has been reported for administrative review. If no drift in mutable characteristics of a CPLD has been reported, embodiments may continue, at 555, to continue monitored booting of the OS/BIOS 505 and of operations managed by the DC-SCM 201. If drift in mutable characteristics of the CPLD is detect in the notification provided to the OS/BIOS 505, at 540, embodiments may prompt the user to confirm the drift in firmware and/or configurable settings in use by the CPLD 205, 212. In some embodiments, a user may be provided prompts by which to confirm or reject each instance of drift that is detected.

As indicated in FIG. 5, the OS/BIOS 505 may procure confirmation of drift in mutable characteristics of the CPLD, which is confirmed, at 545, by the PRoT security processor 206. In scenarios where the detected drift is not confirmed as allowed, at 560, the PRoT security processor 206 may signal errors that may result in disabling of the CPLD 205, 212, or in operation of the CPLD in a safe mode that limits its allowed operations, such as to limit APIs that are supported by the CPLD. In scenarios where the detected drift in mutable characteristics of the CPLD is confirmed as allowed by the user, at 550, the PRoT security processor 206 updates the reference measurements that are stored for this particular CPLD 205, 212 to denote the confirmed firmware and/or configurable settings as the golden measurements for the CPLD.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a plurality of HPMs (Host Processor Modules), each comprising:
one or more CPLDs (Complex Programmable Logic Devices), each operated through the execution of firmware, and each identified by one or more unique hardware identifiers, and each operated using a plurality of configurable settings, wherein each of the CPLDs is configured to transmit a bitstream of the firmware to a DC-SCM while loading the firmware for execution; and the DC-SCM (Data Center Secure Control Module) comprising:

at least one processor; and at least one memory coupled to the at least one processor, wherein the at least one memory comprises program instructions stored thereon that, upon execution by the at least one processor, cause the at least one processor to:

determine whether the signed bitstream transmitted by each of the CPLDs matches a golden firmware measurement maintained for each respective CPLD;

determine whether the one or more unique identifiers of each of the CPLDs matches a golden hardware identity measurement maintained for each respective CPLD; and determine whether the configurable settings in use by each of the CPLDs matches a golden configuration settings measurement maintained for each respective CPLD.

2. The IHS of claim 1, wherein the DC-SCM further comprises a CPLD operated through the execution of firmware, and identified by one or more unique hardware identifiers, and operated using a plurality of configurable settings.

3. The IHS of claim 1, wherein execution of instructions by the processor of the DC-SCM causes the processor to: determine whether firmware loaded for use by the CPLD of the DC-SCM matches a golden firmware measurement maintained for this CPLD.

4. The IHS of claim 3, wherein execution of instructions by the processor of the DC-SCM causes the processor to: determine whether one or more unique identifiers reported by the CPLD of the DC-SCM match a golden hardware identity measurement maintained for this CPLD.

5. The IHS of claim 4, wherein execution of instructions by the processor of the DC-SCM causes the processor to: determine whether one or more configurable settings reported in use by the CPLD of the DC-SCM match a golden configuration settings measurement maintained for this CPLD.

6. The IHS of claim 1, wherein the at least one processor comprises a platform Root-of-Trust (PRoT).

7. The IHS of claim 1, wherein one or more of the CPLDs comprise FPGAs (Field Programmable Gate Arrays).

8. The IHS of claim 1, wherein the plurality of configurable settings comprise at least one of security settings and debugging settings.

9. The IHS of claim 8, wherein the debugging settings comprise the status of a Joint Test Action Group (JTAG) interface of a Host Processor Module to which each respective CPLD is coupled.

10. The IHS of claim 1, wherein each of the CPLDs is configured to halt execution of the loaded firmware until receiving notification that the signed bitstream transmitted by each respective CPLD matches the golden firmware measurement maintained for each respective CPLD.

11. A DC-SCM (Data Center Secure Control Module) comprising:

at least one processor; and at least one memory coupled to the at least one processor, wherein the at least one memory comprises program instructions stored thereon that, upon execution by the at least one processor, cause the at least one processor to:

receive a bitstream of firmware that is transmitted by a CPLD of an HPM (Host Processor Module) while loading the firmware for execution;

determine when the received firmware matches a golden firmware measurement maintained for the CPLD;

receive one or more unique identifiers reported by the CPLD;

determine when the one or more unique identifiers reported by the CPLD matches a golden hardware identity measurement for the CPLD;

receive a report of configurable settings in use by the CPLD; and determine whether the configurable settings in use by the CPLD matches a golden configuration settings measurement maintained the CPLD.

12. The DC-SCM of claim 11, further comprising a CPLD operated through the execution of firmware, and identified by one or more unique hardware identifiers, and operated using a plurality of configurable settings.

13. The DC-SCM of claim 11, wherein the at least one processor comprises a platform Root-of-Trust (PRoT).

14. The DC-SCM of claim 11, wherein the CPLD comprises an FPGA.

15. The DC-SCM of claim 11, wherein the plurality of configurable settings comprise at least one of security settings and debugging settings.

16. One or more non-transitory computer-readable storage device storing program instructions, that when executed on or across one or more processors, cause the one or more processors to:

receive a bitstream of firmware that is transmitted by a CPLD of an HPM (Host Processor Module) while loading the firmware for execution;

determine when the received firmware matches a golden firmware measurement maintained for the CPLD;

receive one or more unique identifiers reported by the CPLD;

determine when the one or more unique identifiers reported by the CPLD matches a golden hardware identity measurement for the CPLD;

receive a report of configurable settings in use by the CPLD; and determine whether the configurable settings in use by the CPLD matches a golden configuration settings measurement maintained the CPLD.

17. The computer-readable storage device of claim 16, wherein the at least one processor comprises a platform Root-of-Trust (PRoT).

18. The computer-readable storage device of claim 16, wherein the CPLD comprises an FPGA.

19. The computer-readable storage device of claim 16, wherein the plurality of configurable settings comprise at least one of security settings and debugging settings.

20. The computer-readable storage device of claim 19, wherein the debugging settings comprise the status of a Joint Test Action Group (JTAG) interface of a Host Processor Module to which each respective CPLD is coupled.

* * * * *